May 8, 1962 H. T. KELSH 3,033,076
VARIABLE DIAPHRAGM FOR PHOTOGRAMMETRIC PROJECTION INSTRUMENT
Filed Nov. 4, 1958 3 Sheets-Sheet 1

*INVENTOR.*
HARRY T. KELSH
BY
*Albert J. Kramer*
ATTORNEY

May 8, 1962　　　H. T. KELSH　　　3,033,076
VARIABLE DIAPHRAGM FOR PHOTOGRAMMETRIC PROJECTION INSTRUMENT
Filed Nov. 4, 1958　　　3 Sheets-Sheet 2

*INVENTOR.*
HARRY T. KELSH
BY
Albert J. Kramer
ATTORNEY

May 8, 1962 H. T. KELSH 3,033,076
VARIABLE DIAPHRAGM FOR PHOTOGRAMMETRIC PROJECTION INSTRUMENT
Filed Nov. 4, 1958 3 Sheets-Sheet 3

INVENTOR
HARRY T. KELSH

BY *Albert J. Kramer*
ATTORNEY

United States Patent Office 3,033,076
Patented May 8, 1962

3,033,076
VARIABLE DIAPHRAGM FOR PHOTOGRAMMETRIC PROJECTION INSTRUMENT
Harry T. Kelsh, Washington, D.C., assignor to The Kelsh Instrument Company, Inc., Baltimore, Md., a corporation of Maryland
Filed Nov. 4, 1958, Ser. No. 771,865
8 Claims. (Cl. 88—24)

This invention relates to photogrammetric projection instruments and it is more particularly concerned with the provision of a variable diaphragm in combination with a photogrammetric projection instrument of the type used in the preparation of maps from aerial photographs.

An object of the invention is the provision of a photographic projection instrument of the type mentioned in which there is incorporated a variable diaphragm and means for automatically varying the size of the aperture of the diaphragm in accordance with predetermined requirements.

Another object of the invention is the provision of variable diaphragms in a photogrammetric projection instrument of the type described in U.S. Patent No. 2,552,975 containing a pair of swinging light beam projectors and means for varying the openings of the diaphragms in amounts corresponding to the respective positions of the swinging projectors relative to predetermined positions.

In instruments of the type described in said Patent No. 2,552,975, the diaphragm opening has heretofore been fixed. When the swinging light beam sources are at unequal distances from the movable mapping table, the light thereon from these two different sources will project stereoscopic pairs of images on the mapping table of unequal luminosity.

This condition of unequal luminosity has, heretofore, been overcome by varying the intensity of the light beam sources themselves. However, since the maximum luminosity is always desired in order to obtain the clearest and brightest images, the light sources are initially set for their maximum intensity and, when necessary to obtain a balance of light under any unequal position of these light sources, the source closest to the mapping table was dimmed, because the other light source was already at its maximum intensity. This, however, had the effect of reducing the clearness of the resulting stereoscopic image, thereby reducing the accuracy of results.

Accordingly, a further object of the invention is the provision of variable diaphragms in a stereoscopic photogrammetric projection instrument and mechanical linkages associated therewith for increasing the opening of the diaphragm of the light source farthest away to balance the light of the images falling on the tracing table.

These objects and still further objects, advantages and features of the invention will appear more fully from the following description considered together with the accompanying drawing.

Figure 1:
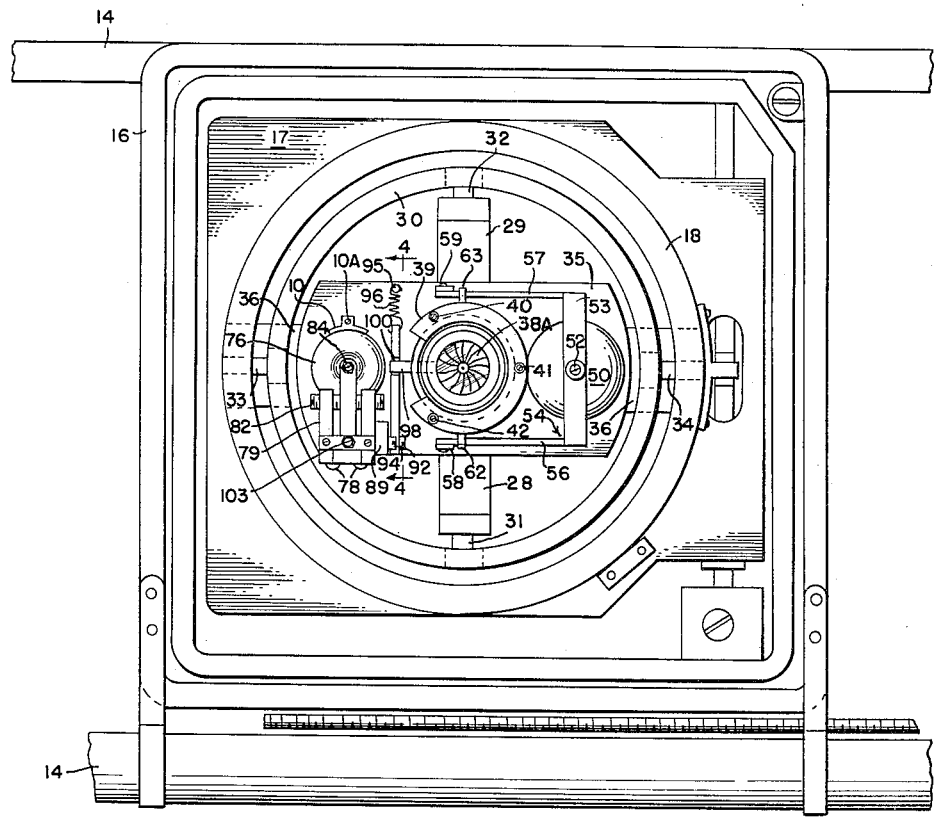
FIG. 1 is a top plan view of one of the lens mountings of a stereoscopic photogrammetric instrument containing an embodiment of the invention and the diaphragm in its position of minimum opening.
Figure 3:
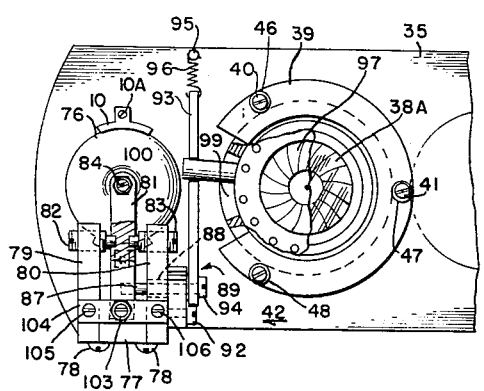
FIG. 3 is a portion of FIG. 1, including the diaphragm, on a larger scale, partly in section, but with the diaphragm moved to increase the size of its opening.

Referring with more particularity to the drawing in which like numerals designate like parts, the invention is illustrated in conjunction with one of the lens mountings of a stereoscopic photogrammetric projection instrument of the type described in U.S. Patent No. 2,552,975 granted to me on May 15, 1951 and to which reference is made for a full description of the instrument and its basic parts. It is to be understood, however, that each of the lens mountings of such an instrument will have incorporated therein the structure described herein.

The lens mountings described in said patent each comprise a base member 16 mounted on parallel tracks 14, 14. An inner adjustable block 17 contains an annular rotatable flange 18 recessed in its top, which receives the lower end of a hoodlike member in the form of an inverted truncated cone or pyramid (not shown herein) which supports a glass plate or slide (not shown) containing the photographic image, said plate sometimes being referred to as a diapositive.

The light passes from the lens system to a movable projection screen 129 through a light tube 23 which is supported for universal movement by being secured to the lower ends of yoke arms 28 and 29, the upper ends of which are pivoted to a gimbal ring 30 by means of pins 31 and 32. The gimbal ring is, in turn, pivotally supported on the block 17 by means of pins 33 and 34.

Figure 7:
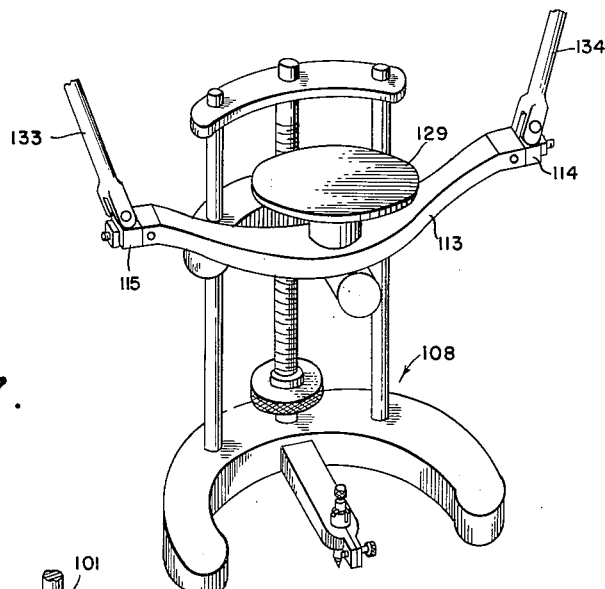
FIG. 7 is a perspective view of a form of tracing table.
Figure 8:
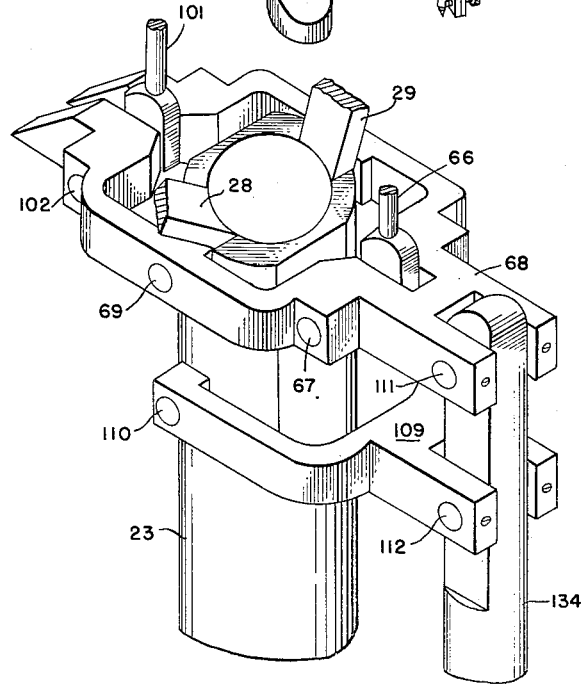
FIG. 8 is a fragmentary view in perspective of the parallelogram linkage between one of the light tubes and its corresponding space rod.

The projection screen 129 is associated with means 108 for recording data corresponding to elements of the projected images when viewed stereoscopically. The means illustrated is generally referred to as a movable tracing table and is shown in FIG. 7.

Above the member 23 there is disposed a bridge 35, the ends of which are secured to the block 17 by arms 36. The bridge 35 is provided with a vertical aperture 37 aligned with the axis of the member 23. Within the aperture 37 there is slidably mounted in a vertical direction a tubular lens barrel 38, carrying a lens composed of lens elements 38A and 38B and having at its upper end an outward horizontal flange 39. A plurality of vertical pins 40, 41 and 42 are slidably mounted through the flange 39 in spaced relation equidistantly from the center of the barrel 38. The lower ends of the said pins are rigidly secured to the bridge member 35 by any suitable means such as threads, soldering, or any other means. The pins 40, 41 and 42 are provided with heads 43, 44 and 45 at their upper ends and compression springs 46, 47 and 48 are disposed between said heads, respectively, and the upper surface of the flange 39 so as to urge the lens barrel 38 downwardly in the aperture 37.

The invention as described hereinafter is adaptable apart from or in conjunction with distortion compensation means and is illustrated in conjunction with such means for the sake of completeness. These means comprise an annular seat 49 through the bridge member 35 on one side of the aperture 37, said seat having a spherical segment surface diverging upwardly and which is adapted to support a ball member 50. The lower surface of the ball member 50 is spherical and free to move on the seat 49. It is held on the seat by means of arcuate cleats 9 and 10 removably secured to the bridge 35 by screws 9A and 10A, respectively, in abutting engagement with the cam surface. The upper end of the ball 50 is provided with a special contour or cam surface 51. A cam follower 52 in the form of a vertical pin having a ball point at its lower end engages the top of the ball member 50 substantially as shown. Said follower 52 is secured to the web 53 of a U-shaped member 54. The parallel arms 56 and 57 of the member 54 are pivoted at the opposite end to posts 58 and 59, said posts being secured to the bridge member 35.

Projecting outwardly from the lens barrel 38 are pins 62 and 63, which rest in notches in the arms 56 and 57. By these means, the springs 46, 47 and 48 hold the point of the follower 52 in constant engagement with the ball member 50. As the ball member moves, depending upon the contour of its upper portion 51, the ball point rises and falls and causes the lens barrel 38 also to rise and fall a corresponding distance as determined by the leverage of the U-shaped member 54.

The ball member 50 is moved by means of a depending arm or rod 66 having one end secured to the bottom thereof and the other end of the rod pin-connected at 67 to a yoke 68. The arms of the yoke 68 straddle the tube 23 and are pivoted to the tube by means of pins 69 across a diameter of the tube 23 parallel to the axis of the pins 31 and 32. Another yoke 109 is set parallel to the yoke 68 and is pivoted to the tube 23 by pins 110 directly below the pins 69. A space rod 134 has its upper end connected to the yokes 68 and 109 by means of pins 111 and 112. The lower end of the space arm 134 is connected to one end of a transverse bar 113 of the tracing table by a universal joint 114. The other end of the bar 113 is connected to the lower end of another space rod 133 by a universal joint 115, the upper end being connected to a linkage similar to that shown in FIG. 5 for a second projector (not shown).

In accordance with this invention there is provided an additional annular seat 75 in the bridge 35 for a ball cam 76. Although the ball cam 76 and seat 75 may be provided independently of the ball cam 50 and seat 49, when used in conjunction therewith, they are preferably disposed, as illustrated, on opposite sides of the lens barrel aperture 37.

A cam follower bracket 77 is secured to the bridge by screws 78 and comprises a pair of overhanging horizontal arms 79 and 80 above the ball cam 76. A rocker lever 81 is disposed between the arms 79 and 80 and is pivotally connected thereto by means of pivot pins 82 and 83. The outer end of the lever 81 is provided with a cam follower in the form of a threaded pin 84 having a bottom point 85 in vertical alignment with the center of the seat 75. A holding nut 86 permits securing the follower in vertically adjusted positions.

On the opposite side of its pivot axis, there is secured to the lever 81 a pin bar 87 which projects laterally through an arcuate slot 88 of the arm 80, the center of curvature of which is coincident with the pivot axis of the lever 81.

A bell crank 89 has a vertical 90 and a bifurcated horizontal arm 91. The latter straddles the pin bar 87. The bell crank is pivotally attached to the bracket 77 by a pin shaft 92. The lower end of the vertical arm 90 is pivotally connected to a horizontal bar 93 by means of a pin 94. The bar 93 is disposed alongside the lens barrel 38 and the opposite end is connected to a post 95 by means of a tensioned spring 96 which constantly biases the bar to the right as viewed in FIG. 4 and hence urges the cam follower in contact with the ball cam.

An adjustable diaphragm 97 is secured to the lens barrel 38 between the lens components 38A and 38B at the nodal point of the composite lens and has a radial finger 98 extending therefrom through an arcuate slot 99 in the lens barrel on the side thereof adjacent the bar 93. A transverse slot 100 in the bar 93 is provided to receive and seat the finger 98.

A vertical rod 101 is secured to the bottom of the ball cam 76, extends parallel to the rod 66 of the ball cam 50 and is pin-connected to the arms of the yoke 68 by a pin shaft 102.

Where it is not desired to use the ball cam 50, the yoke arms need extend only between the rod 101 and light tube 23.

Figure 6:
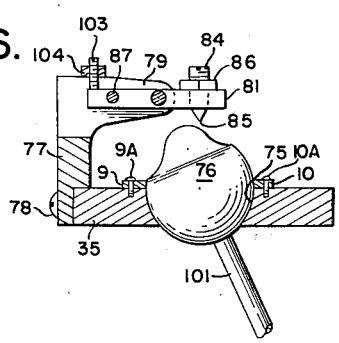
FIG. 6 is a view similar to FIG. 4 partly broken away and with the cam follower set to its non-operative position.
Figure 2:
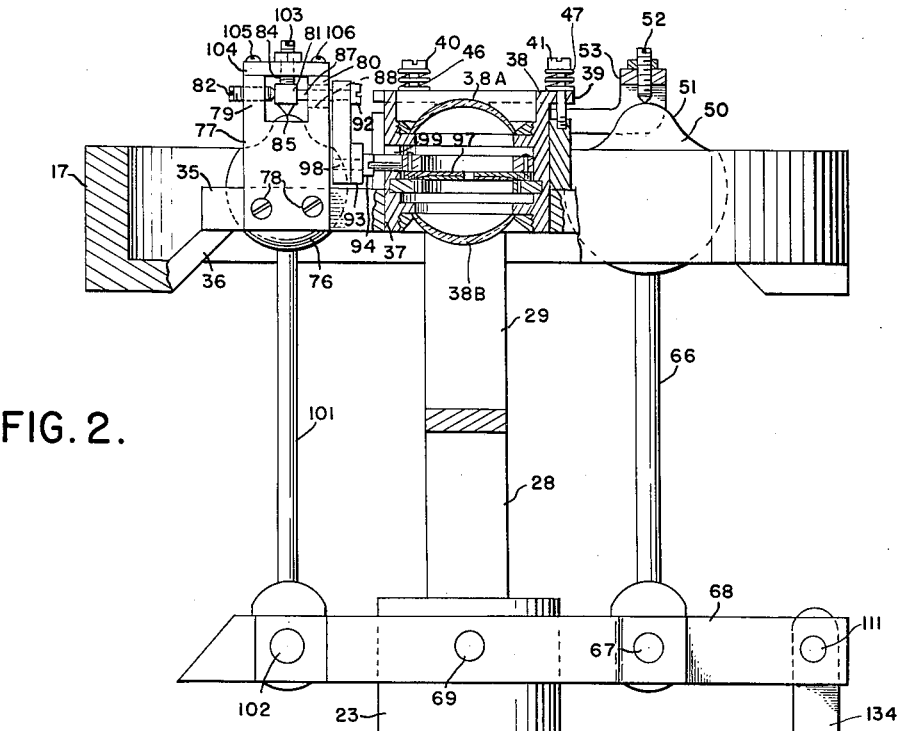
FIG. 2 is a side elevational view of a lens mounting, partly broken away, and parts appurtenant thereto.

The cam follower may be rendered non-operative by means of a set screw 103 mounted on a cross bar 104 secured to the top of the arms 79 and 80 with screws 105 and 106. This set screw can be turned sufficiently to hold the follower out of engagement with the ball cam 76 as shown in FIG. 6.

Figures 4, 5:
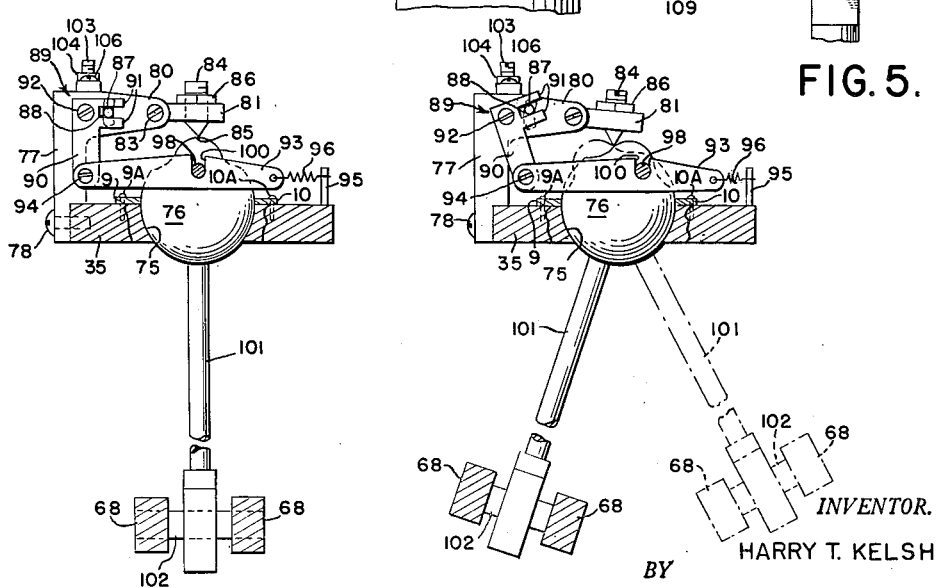
FIG. 4 is a section along the line 4—4 of FIG. 1.
FIG. 5 is a view similar to FIG. 4 with the diaphragm cam illustrated in different positions.

As may be seen from the drawing, particularly FIG. 5, when the light tube is pivoted to any non-vertical position, the contour of the top of the ball 76 is such as to cause the cam follower 84 to fall a predetermined amount relative to the angular displacement of the rod 101 from its vertical position. This causes the pin 88 to move upward in the slot and to rotate the bell crank 89 counterclockwise, as viewed in FIGS. 4 and 5, whereupon the bar 93 moves to the right under the biasing action of the spring 96 and hence causes the finger 98 to move with it and enlarge the opening of the diaphragm 97 a corresponding amount.

Concomitant vertical movement of the lens barrel 38 is permitted under the action of the ball cam 50 by virtue of the slot 100.

The contour of the top of the ball cam 76 is selected for predetermined openings of the diaphragm 97 for all positions of the light tube 23 to achieve light balance between the two projected images of the instrument.

Having thus described my invention, I claim:

1. In a stereoscopic photogrammetric projection instrument having a pair of optical systems through which images are projected for viewing stereoscopically, a movable member having a screen upon which the images are projected in superimposed relation and means for recording data corresponding to elements of the projected images when viewed stereoscopically, a variable aperture diaphragm for each of said optical systems, and means for automatically varying the size of the aperture of each diaphragm inversely relative to the other diaphragm in response to movements of said member.

2. In a stereoscopic photogrammetric projection instrument having a pair of optical systems through which images are projected for viewing stereoscopically, a movable member having a screen upon which the images are projected in superimposed relation and means for recording data corresponding to elements of the projected images when viewed stereoscopically, a variable aperture diaphragm for each of said optical systems, and a mechanical linkage between each diaphragm and the movable member for automatically varying the size of the aperture of each diaphragm inversely relative to the other diaphragm in response to movements of the member.

3. The subject matter of claim 2 in which the linkage includes a cam, a cam follower, resilient means for urging the follower in slidable contact with the cam, means connecting the cam to the member for concomitant movement therewith, and a train of levers connecting the cam follower to the diaphragm for varying the size of the opening of the diaphragm corresponding to movements of the cam follower.

4. The subject matter as defined by claim 3 in which the cam is in the general shape of a ball, and a member having an annular socket for tiltable supporting the cam for universal movement.

5. In a stereoscopic photogrammetric projection instrument having a pair of optical systems through which images are projected for viewing stereoscopically, a movable member having a screen upon which the images are projected in superimposed relation and means for recording data corresponding to elements of the projected images when viewed stereoscopically, a variable aperture diaphragm for each of said optical systems, a cam, a cam follower, resilient means for urging the follower in slidable contact with the cam, means connecting the cam to the member for concomitant movement therewith, a mechanical linkage connecting the cam follower to the diaphragm for varying the size of the opening of the diaphragm corresponding to movements of the cam follower, and means for selectively holding the cam follower out of contact with the cam in opposition to the resilient means.

6. In a stereoscopic photogrammetric projection instrument having a pair of optical systems through which images are projected for viewing stereoscopically, a movable member having a screen upon which the images are projected in superimposed relation and means for recording data corresponding to elements of the projected images when viewed stereoscopically, a variable aperture diaphragm for each of said optical systems, a cam, a cam follower, resilient means for urging the follower in slidable contact with the cam, means connecting the cam to the member for concomitant movement therewith, a mechanical linkage connecting the cam follower to the diaphragm for varying the size of the opening of the diaphragm corresponding to movements of the cam follower, and means for adjusting the position of the linkage relative to the cam for any given position of the cam.

7. In a stereoscopic photogrammetric projection instrument having a pair of optical systems through which images are projected in superimposed relation and means for recording data corresponding to elements of the projected images when viewed stereoscopically, a variable aperture diaphragm for each of said optical systems, having an adjusting member movable between two extreme positions to change the size of the aperture, a cam, a cam follower, a pivoted lever having one end attached to the cam follower, means connecting the other end of the lever to the adjusting member for comovement therewith, resilient means biasing the adjusting member to one of its extreme positions, and means for actuating the cam in accordance with movement of the screen.

8. In a stereoscopic photogrammetric projection instrument having a pair of optical systems through which images are projected for viewing stereoscopically, a movable member having a screen upon which the images are projected in superimposed relation and means for recording data corresponding to elements of the projected images when viewed stereoscopically, a variable aperture diaphragm for each of said optical systems having an adjusting member movable between two extreme positions to change the size of the aperture, a cam, a cam follower, resilient means urging the cam follower in contact with the cam, means responsive to movements of the lever for actuating the adjusting member in accordance with movements of the lever, and means for actuating the cam in accordance with movements of the screen.

References Cited in the file of this patent
UNITED STATES PATENTS

| | | |
|---|---|---|
| 2,678,583 | Knapik | May 18, 1954 |
| 2,725,805 | Jackson et al. | Dec. 6, 1955 |

FOREIGN PATENTS

| | | |
|---|---|---|
| 678,573 | Germany | July 18, 1939 |